United States Patent
Grechka et al.

(10) Patent No.: US 10,796,245 B2
(45) Date of Patent: Oct. 6, 2020

(54) SYSTEMS AND METHODS FOR SELECTING CONTENT TO SEND TO LABELERS FOR PREVALENCE ESTIMATION

(71) Applicant: Facebook, Inc., Menlo Park, CA (US)

(72) Inventors: Yevgeniy Grechka, East Palo Alto, CA (US); David James Radburn-Smith, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 677 days.

(21) Appl. No.: 15/665,325

(22) Filed: Jul. 31, 2017

(65) Prior Publication Data

US 2019/0034827 A1    Jan. 31, 2019

(51) Int. Cl.
- *G06N 20/00* (2019.01)
- *G06F 17/18* (2006.01)
- *G06Q 50/00* (2012.01)

(52) U.S. Cl.
CPC ............. *G06N 20/00* (2019.01); *G06F 17/18* (2013.01); *G06Q 50/00* (2013.01); *G06Q 50/01* (2013.01)

(58) Field of Classification Search
CPC ............. G06F 11/3447; G06F 11/3452; G06F 2212/1016; G06N 99/005; G06N 20/00
See application file for complete search history.

(56) References Cited

U.S. PATENT DOCUMENTS

| | | | | |
|---|---|---|---|---|
| 6,363,494 | B1 * | 3/2002 | Farah | G06F 11/2263 710/29 |
| 8,577,884 | B2 * | 11/2013 | Poteet | G06Q 30/02 707/737 |
| 9,959,412 | B2 * | 5/2018 | Strauss | G06F 21/577 |
| 10,223,464 | B2 * | 3/2019 | Winstanley | G06F 16/951 |
| 10,334,072 | B2 * | 6/2019 | Tannen | H04L 67/327 |
| 10,489,383 | B1 * | 11/2019 | McCoy | G06F 9/4843 |
| 2017/0262635 | A1 * | 9/2017 | Strauss | G06F 21/577 |
| 2019/0034827 | A1 * | 1/2019 | Grechka | G06N 20/00 |

OTHER PUBLICATIONS

Convex Optimization; https://web.stanford.edu/~boyd/cvxbook/bv_cvxbook.pdf, Aug. 21, 2011.
Sculley et al.; Detecting Adversarial Advertisements in the Wild; https://www.eecs.tufts.edu/~dsculley/papers/adversarial-ads.pdf.
Emanuel Alexandre Strauss et al.; Sampling Content Using Machine Learning to Identify Low-Quality Content; U.S. Appl. No. 15/067,498, filed Mar. 11, 2016.

* cited by examiner

*Primary Examiner* — Paulinho E Smith
(74) *Attorney, Agent, or Firm* — FisherBroyles, LLP

(57) ABSTRACT

A method for selecting content to send to labelers for prevalence estimation may include (1) selecting a prevalence estimator, (2) sampling content items from an online system, (3) using, for each of the content items, a model to generate a score for the content item that indicates a likelihood that the content item is of a class of content, (4) generating buckets that each (a) is assigned a range of scores from the model and (b) contains a subset of the content items whose scores fall within the range of scores, (5) determining a sampling rate for each of the buckets that minimizes a variance metric of the estimator, (6) selecting, from each of the buckets, a portion of content items according to the sampling rate of the bucket, and (7) sending the portions to labelers for labeling. Various other methods, systems, and computer-readable media are also disclosed.

20 Claims, 8 Drawing Sheets

Method 300 

```
                    ( Start )
                        │
                        ▼
┌─────────────────────────────────────────────────────────────┐
│ Select an estimator of a prevalence of a class of content   │
│                  within an online system                    │
│                            310                              │
└─────────────────────────────────────────────────────────────┘
                        │
                        ▼
┌─────────────────────────────────────────────────────────────┐
│          Sample content items from the online system         │
│                            320                              │
└─────────────────────────────────────────────────────────────┘
                        │
                        ▼
┌─────────────────────────────────────────────────────────────┐
│ Use, for each of the content items, a machine-learning      │
│ classification model to generate a score for the content    │
│ item that indicates a likelihood that the content item is   │
│                  of the class of content                    │
│                            330                              │
└─────────────────────────────────────────────────────────────┘
                        │
                        ▼
┌─────────────────────────────────────────────────────────────┐
│ Generate buckets that each (a) is assigned a range of       │
│ scores from the machine-learning classification model and   │
│ (b) contains a subset of the content items whose scores     │
│               fall within the range of scores               │
│                            340                              │
└─────────────────────────────────────────────────────────────┘
                        │
                        ▼
┌─────────────────────────────────────────────────────────────┐
│ Determine a sampling rate for each of the buckets that      │
│         minimizes a variance metric of the estimator        │
│                            350                              │
└─────────────────────────────────────────────────────────────┘
                        │
                        ▼
┌─────────────────────────────────────────────────────────────┐
│ Select, from each of the buckets, a portion of content      │
│    items according to the sampling rate of the bucket       │
│                            360                              │
└─────────────────────────────────────────────────────────────┘
                        │
                        ▼
┌─────────────────────────────────────────────────────────────┐
│ Send the portion of content items from each of the buckets  │
│               to human labelers for labeling                │
│                            370                              │
└─────────────────────────────────────────────────────────────┘
                        │
                        ▼
                     ( End )
```

FIG. 3

SYSTEMS AND METHODS FOR SELECTING CONTENT TO SEND TO LABELERS FOR PREVALENCE ESTIMATION

BACKGROUND

Online systems, such as social networking systems, allow users to connect to and communicate with other users of the online system. Users may create profiles on an online system that are tied to their identities and that include information about the users, such as interests and demographic information. Online systems may allow users to easily communicate and to share content with other online system users by providing content to an online system for presentation to other users. Content provided to an online system by a user (i.e., user-provided content) may be declarative information provided by a user, status updates, images, photographs, videos, text data, any other information a user wishes to share with other users of the online system, or a combination thereof. Content provided to an online system may also include sponsored content that a sponsoring user (e.g., an organization) requests to be presented to other users who are not necessarily connected with the sponsoring user. To ensure that users have a high-quality experience, many online systems maintain content policies that prohibit or control content with objectionable, offensive, suggestive, violent, sensational, illegal, unintelligible, and/or malicious elements.

The prevalence of a particular class of content (e.g., a class of content that violates a content policy) may be a useful metric to administrators of online systems. Conventional techniques for determining the prevalence of a class of content typically include (1) sampling content from an online system, (2) sending the sampled content to human labelers that may label the sampled content as being of the class or not of the class, and (3) inferring the prevalence of the class of content based on the labels provided by the human labelers.

In a typical online system, the prevalence of content items that violate the online system's content policies may be very low. Unfortunately, the accuracy of human labelers to identify items that belong to a particular class of content generally suffers when the human labelers infrequently encounter content of the class. For at least this reason, if the content that is sent to human labelers is randomly sampled from the online system, the proportion of the volume of content that is of the class that reaches the human labelers is likely to be very low (perhaps 0.5% of the total volume, which may result in human labelers encountering only 1 content item in 200 that is of the class). If a human labeler sees only one content item out of many content items, the human labeler may be more likely to miss the content item and mistakenly label the content item as not belonging to the class. As a result of these types of human errors, some prevalence measurements that are generated by conventional techniques may be unreasonably inaccurate. The instant disclosure, therefore, identifies and addresses a need for systems and methods that more optimally select content to send to human labelers.

SUMMARY

As will be described in greater detail below, the instant disclosure describes various systems and methods for selecting content to send to labelers for prevalence estimation using various constrained-optimization techniques. In one example, a method for selecting content to send to labelers for prevalence estimation may include (1) selecting an estimator of a prevalence of a class of content within an online system (e.g., a class of content that violates a content policy of the online system), (2) sampling content items from the online system, (3) using, for each of the content items, a machine-learning classification model to generate a score for the content item that indicates a likelihood that the content item is of the class of content, (4) generating buckets that each (a) is assigned a range of scores from the machine-learning classification model and (b) contains a subset of the content items whose scores fall within the range of scores, (5) determining a sampling rate for each of the buckets that minimizes a variance metric of the estimator, (6) selecting, from each of the buckets, a portion of content items according to the sampling rate of the bucket, and (7) sending the portion of content items from each of the buckets to one or more human labelers for labeling. In some examples, the estimator may rely upon labeled content items that have been labeled by the one or more human labelers as being of the class of content.

In some examples, the step of determining the sampling rate for each of the buckets may include minimizing an approximation of the variance metric of the estimator subject to one or more constraints, and the approximation of the variance metric of the estimator may be based on the sampling rate of each of the buckets. In certain examples, the approximation of the variance metric of the estimator may be further based on (1) a first probability metric of each of the buckets that indicates a probability that a sampled content item will fall into the bucket, (2) a second probability metric of each of the buckets that indicates a probability that a sampled content item from the bucket will be of the class of content, and (3) a count of the content items. Additionally, the one or more constraints may be based on (1) the sampling rate of each of the buckets, (2) the first probability metric of each of the buckets, (3) a predetermined volume of content items that will be sent to the human labelers, and (4) the count of the content items. In at least one example, the one or more constraints may be further based on a predetermined proportion of the predetermined volume of content items that must be of the class of content and the second probability metric of each of the buckets. In some examples, the one or more constraints may be based on (1) a predetermined volume of content items that will be sent to the human labelers and (2) a predetermined proportion of the predetermined volume that must be of the class of content.

In some examples, the step of generating the buckets may include (1) initializing the buckets, (2) assigning an initial range of scores from the machine-learning classification model to each of the buckets, and (3) iteratively perturbing the initial ranges of scores of the buckets until the variance metric of the estimator is minimized. In certain examples, the step of iteratively perturbing the initial ranges of the scores of the buckets may include, during a single iteration (1) reassigning a different range of scores from the machine-learning classification model to at least two of the buckets, (2) determining a probability metric of each of the buckets that indicates a probability that a sampled content item from the bucket will be of the class of content, (3) determining a sampling rate for each of the buckets that minimizes the variance metric of the estimator, and (4) calculating the variance metric of the estimator.

In some examples, the computer-implemented method may further include using, for each of the content items, an additional machine-learning classification model to generate an additional score for the content item that indicates an additional likelihood that the content item is of the class of content. In these examples, each of the buckets may be further assigned an additional range of scores from the additional machine-learning classification model and may contain a subset of the content items whose scores fall within the range of scores and whose additional scores fall within the additional range of scores. In some examples, the computer-implemented method may further include (1) receiving, from the one or more human labelers, the labeled content items that have been labeled by the one or more human labelers as being of the class of content and (2) using the labeled content items and the estimator to estimate the prevalence of the class of content within the online system.

In addition, a corresponding system for selecting content to send to labelers for prevalence estimation may include several modules stored in memory, including (1) an estimator-selecting module that selects an estimator of a prevalence of a class of content within an online system, (2) a sampling module that samples content items from the online system, (3) a scoring module that uses, for each of the content items, a machine-learning classification model to generate a score for the content item that indicates a likelihood that the content item is of the class of content, (4) a bucketing module that generates buckets that each (a) is assigned a range of scores from the machine-learning classification model and (b) contains a subset of the content items whose scores fall within the range of scores, (5) a rate-determining module that determines a sampling rate for each of the buckets that minimizes a variance metric of the estimator, (6) a content-selecting module that selects, from each of the buckets, a portion of content items according to the sampling rate of the bucket, and (7) a sending module that sends the portion of content items from each of the buckets to the one or more human labelers for labeling. In some examples, the estimator may rely upon labeled content items that have been labeled by one or more human labelers as being of the class of content. In at least one example, the system may also include at least one processor that executes the estimator-selecting module, the sampling module, the scoring module, the bucketing module, the rate-determining module, the content-selecting module, and the sending module.

In some examples, the above-described method may be encoded as computer-readable instructions on a computer-readable medium. For example, a computer-readable medium may include one or more computer-executable instructions that, when executed by at least one processor of a computing device, may cause the computing device to (1) select an estimator of a prevalence of a class of content within an online system, (2) sample content items from the online system, (3) use, for each of the content items, a machine-learning classification model to generate a score for the content item that indicates a likelihood that the content item is of the class of content, (4) generate buckets that each (a) is assigned a range of scores from the machine-learning classification model and (b) contains a subset of the content items whose scores fall within the range of scores, (5) determine a sampling rate for each of the buckets that minimizes a variance metric of the estimator, (6) select, from each of the buckets, a portion of content items according to the sampling rate of the bucket, and (7) send the portion of content items from each of the buckets to one or more human labelers for labeling. In some examples, the estimator may rely upon labeled content items that have been labeled by the one or more human labelers as being of the class of content.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 3 is a flow diagram of an exemplary method for selecting content to send to labelers for prevalence estimation.

Figure 1:
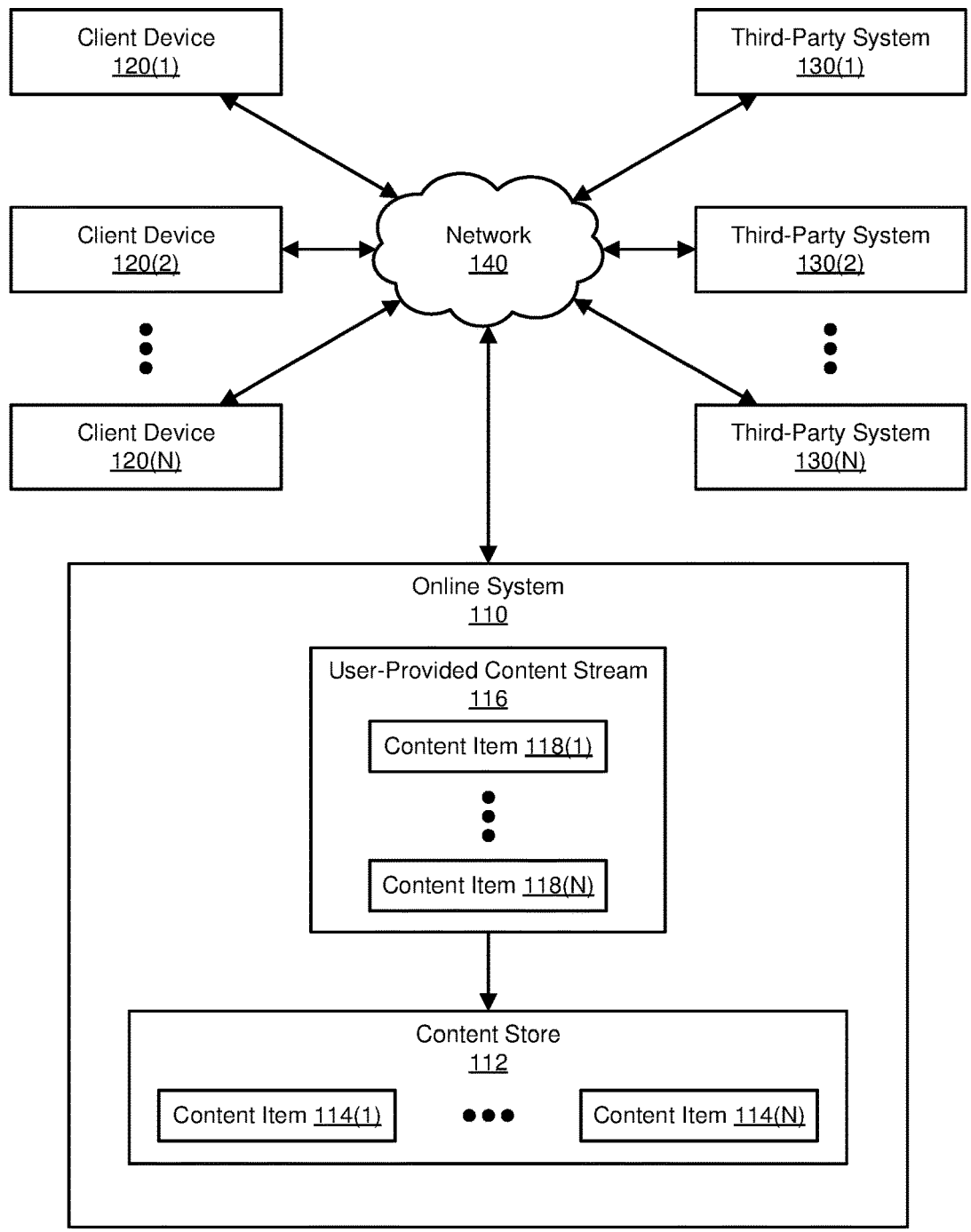
FIG. 1 is a block diagram of an exemplary system environment in which an exemplary online system operates.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for selecting content to send to labelers for prevalence estimation. In many situations, it may be useful for an administrator of an online system to know the prevalence of a particular class of content that is stored to, received at, or found on the online system. As used herein, the term "prevalence" generally refers to a measurement of an amount or proportion of the content that is stored to, received at, or found on an online system that is of a specific class. The prevalence of a class of content on an online system may indicate how much of the class of content is stored to, received at, or found on the online system.

A suitable estimator may be used to estimate the prevalence of a class of content within an online system. As used herein, the terms "estimator" and "prevalence estimator" generally refer to any method or function that may be used to estimate the prevalence of a particular class of content within an online system based on labeled content items sampled from the online system. In general, an estimator of the prevalence of a particular class of content may take as input information that describes the number of content items within a sample of content items that have been labeled by a group of human labelers as belonging to the class and/or the number of content items within the sample that have been labeled by the group of human labelers as not belonging to the class. Using this information, the estimator may the capable of estimating the prevalence of the class of content within the online system.

In some examples, the systems and methods described herein may use an estimator that uses importance-sampling techniques to estimate the prevalence of a particular class of content within an online system. The term "importance sampling" may refer to a procedure whereby (1) content items are sampled from an online system and split up into buckets, (2) the content items that are selected to be sent to human labelers for labeling are chosen, with higher frequency, from the buckets that contain content items that are more likely to be of a target class, and (3) the contributions of labeled content items to an estimation of the prevalence of the target class are weighted accordingly.

As will be explained in greater detail below, by employing constrained-optimization techniques to identify optimal bucket sampling rates for selecting content items to send to human labelers for prevalence estimation purposes, the systems and methods disclosed herein may enable an administrator to specify (1) the volume of content items that should be sent to the human labelers and/or (2) the proportion of the volume that must be of a particular class of content. By enabling the administrator to specify the proportion of content items that must be of a particular class of content, the systems and methods disclosed herein may provide the human labelers with a higher number of content items that are or are likely to be of the class, which may improve the labeling accuracy of the human labelers. Embodiments of the instant disclosure may also provide various other advantages and features, as discussed in greater detail below.

The following will provide, with reference to FIG. 1, detailed descriptions of an example system for selecting content to send to labelers for prevalence estimation. Detailed descriptions of a corresponding data flow and computer-implemented method will also be provided in connection with FIGS. 2-8.

FIG. 1 is a block diagram of exemplary system environment 100 in which an online system 110 operates. As illustrated in this figure, system environment 100 may include one or more client devices 120 and one or more third-party systems 130. In this example, client devices 120(1)-(N) generally represent computing devices of the users of online system 110 that are capable of receiving user input and transmitting content items to online system 110 via network 140 (e.g., the Internet). Third-party systems 130(1)-(N) generally represent computing devices or systems of one or more third-party entities through which users of online system 110 may transmit content items to online system 110 via network 140 and/or from which users of online system 110 may receive content items via online system 110.

As shown in FIG. 1, online system 110 may include a content store 112 that stores one or more content items 114. In this example, online system 110 may additionally receive a user-provided content stream 116 of content items 118 from client devices 120 and/or third-party systems 130 and may store all or a portion of content items 118 to content store 112. Online system 110 may generally represent any system that receives content items from for or on behalf of its users via the Internet and stores and/or hosts these content items for its users. Examples of online system 110 include, without limitation, social-networking systems, photo-sharing systems, video-sharing systems, email systems, file-hosting systems, file-backup systems, news-aggregation systems, and messaging systems.

Figure 2:
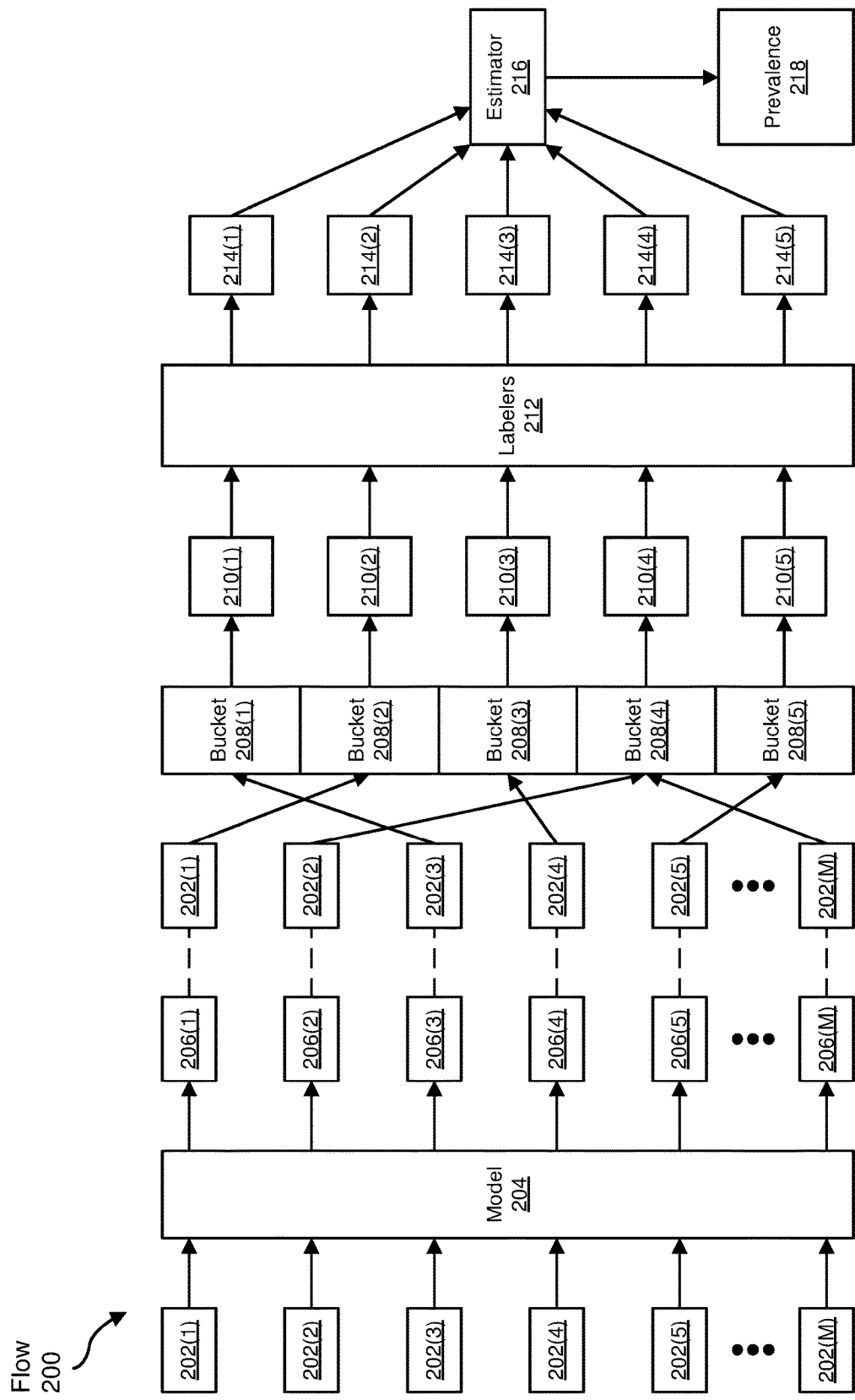
FIG. 2 is a flow diagram of an exemplary data flow for selecting content to send to labelers for prevalence estimation.

FIG. 2 is a flow diagram of exemplary data flow 200 in which sets 214(1)-(5) of content items are used to estimate a prevalence 218 of a class of content within online system 110. In this example, content items 202(1)-(M) may each represent a content item that is randomly sampled from online system 110 (e.g., from content stream 116 and/or content store 112 in FIG. 1). Machine-learning classification model 204 may represent a machine-learning classification model that is capable of estimating a likelihood that a content item is of the class. In this example, machine-learning classification model 204 may be used to generate scores 206(1)-(M) for content items 202(1)-(M), respectively.

Figure 5:
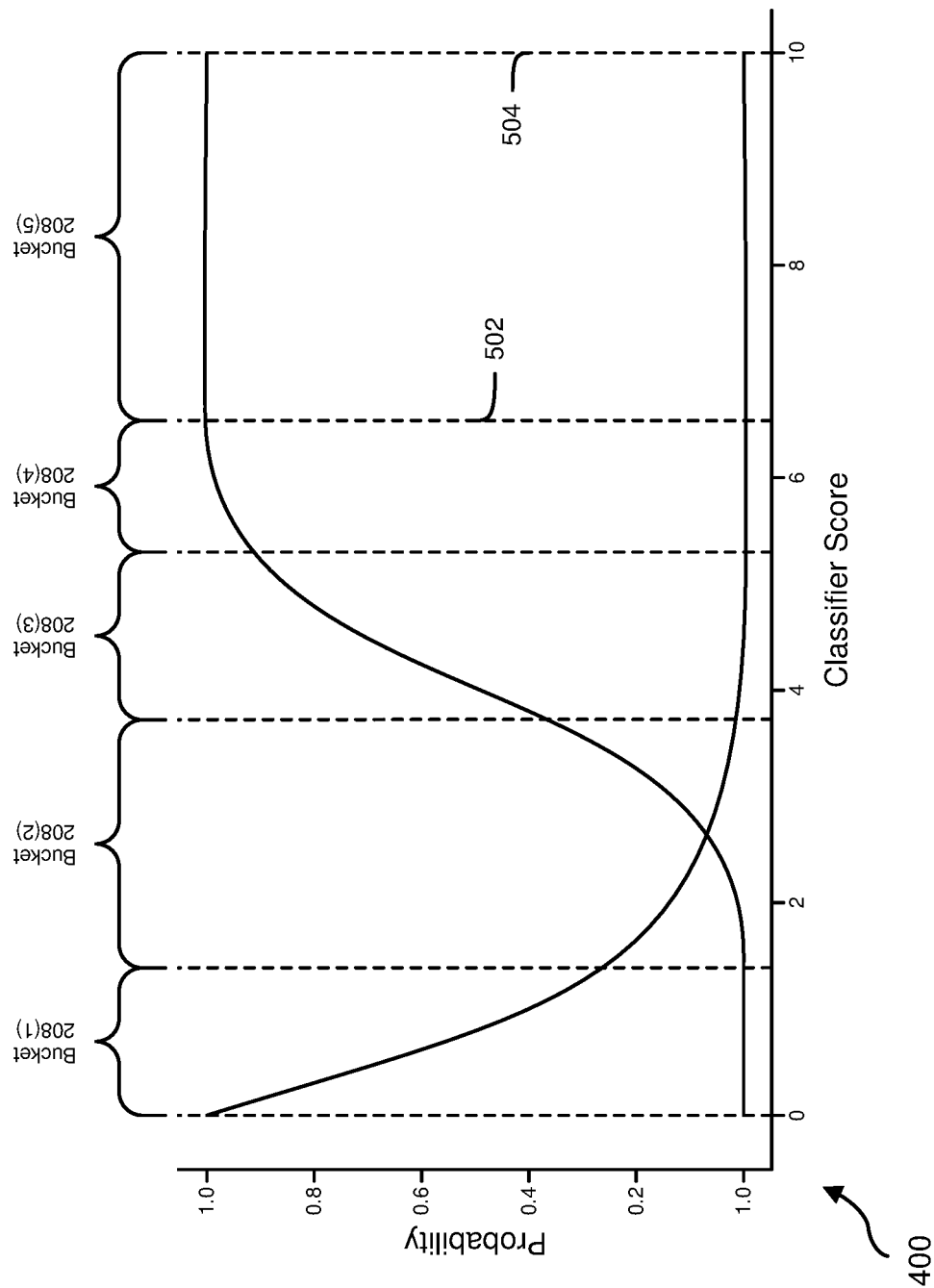
FIG. 5 is a graph diagram illustrating exemplary bucket partitions.
Figure 6:
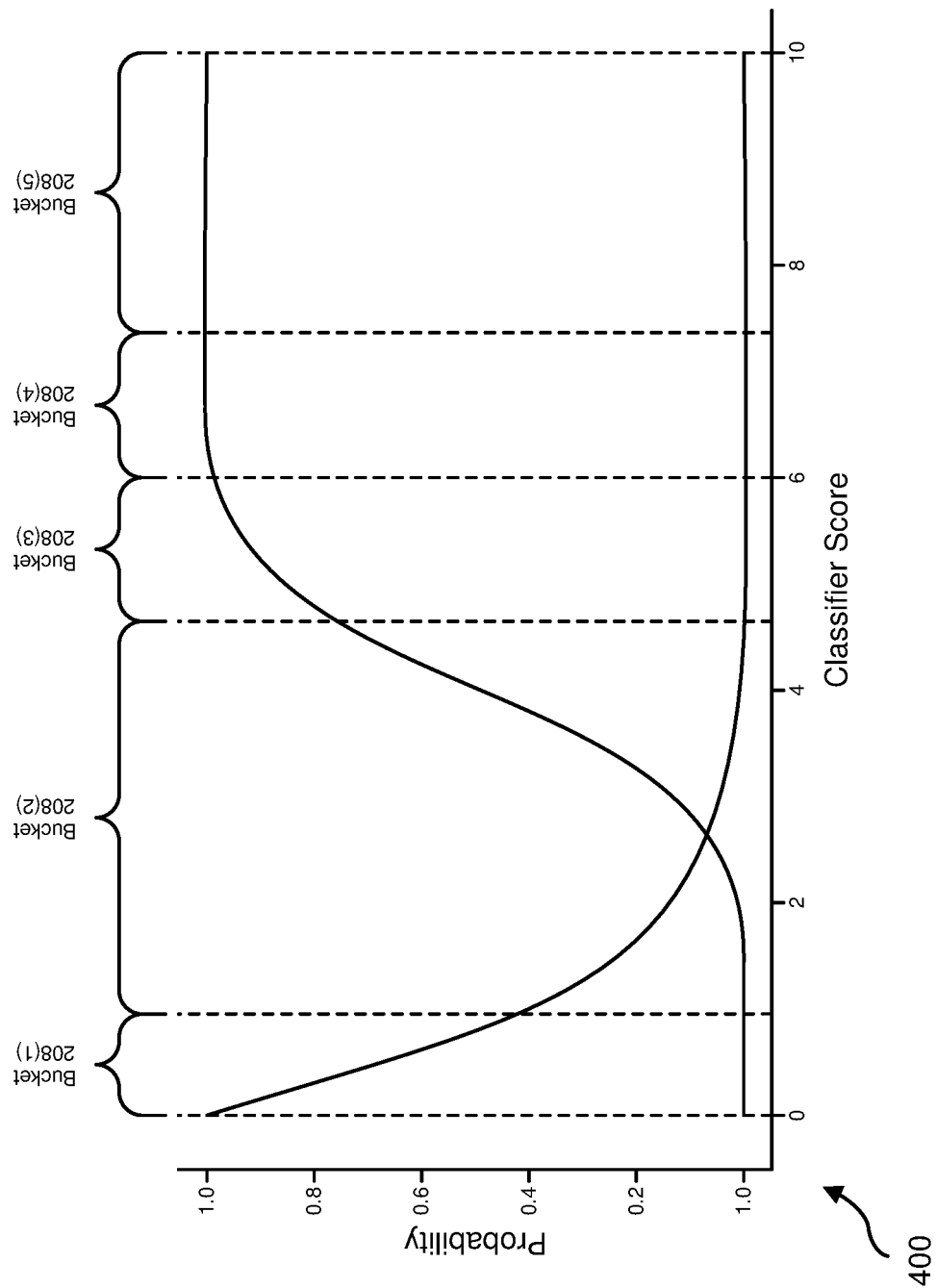
FIG. 6 is a graph diagram illustrating additional exemplary bucket partitions.
Figure 7:
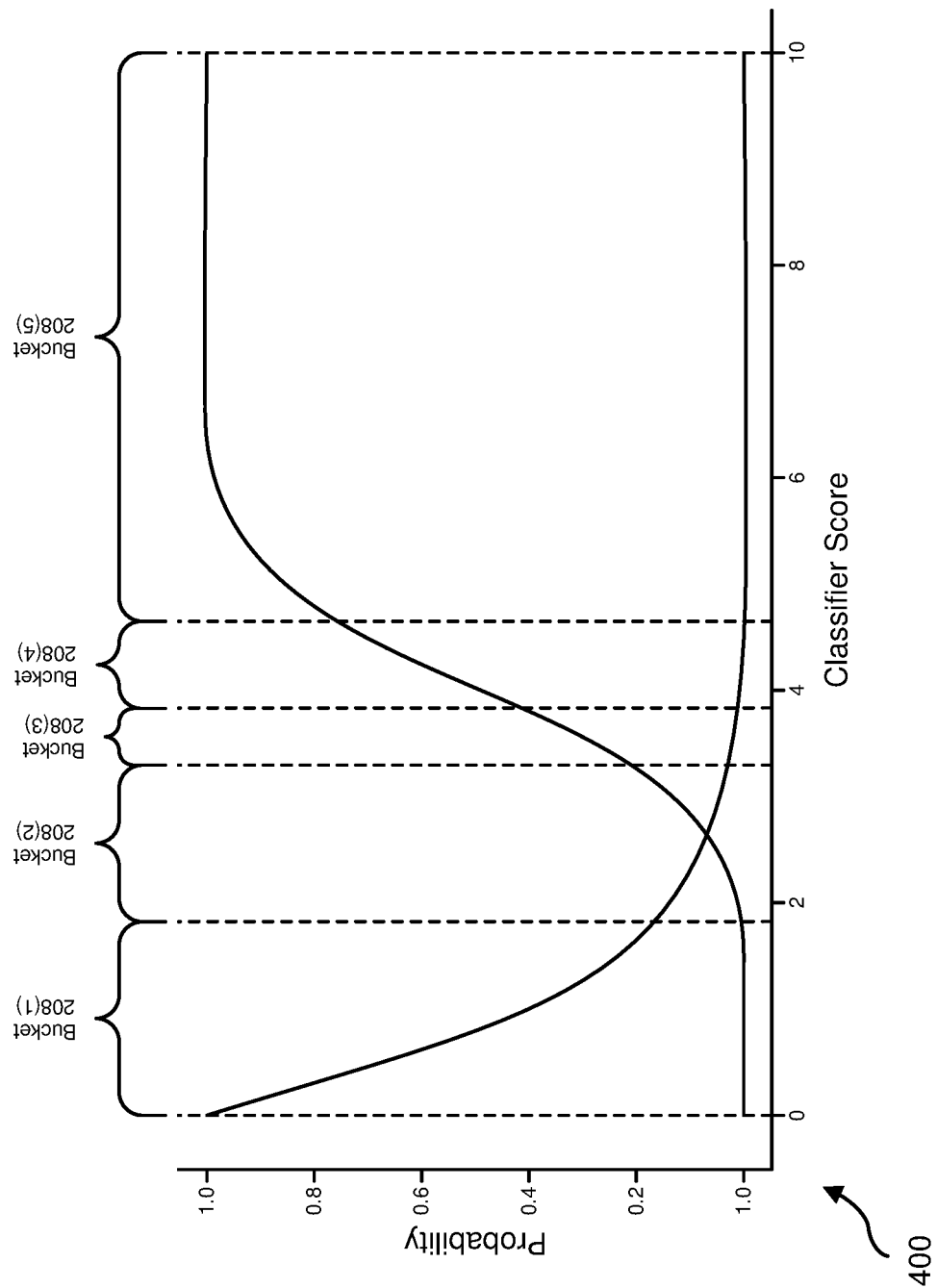
FIG. 7 is a graph diagram illustrating additional exemplary bucket partitions.
Figure 8:
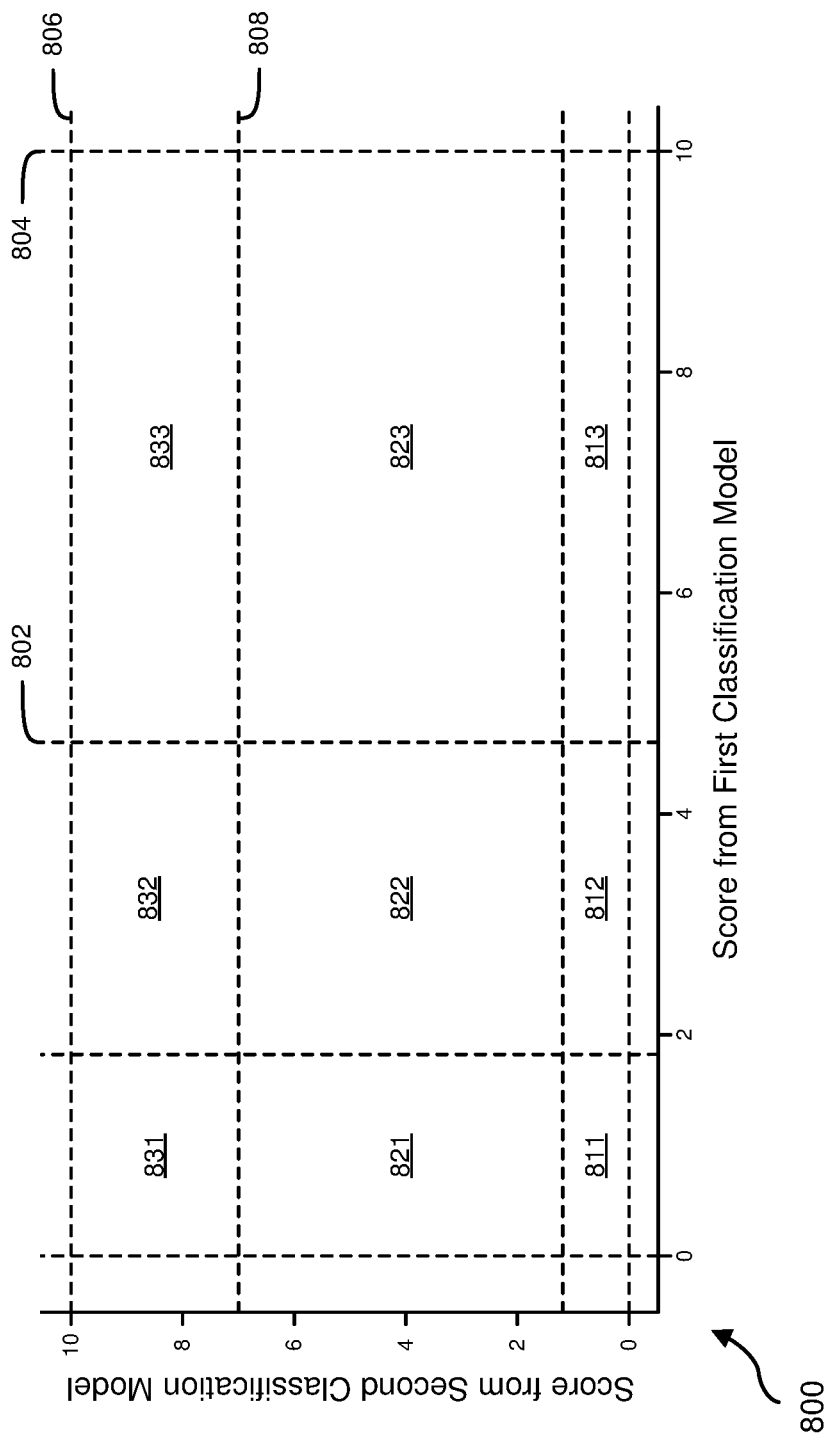
FIG. 8 is a graph diagram illustrating additional exemplary bucket partitions.

Each of buckets 208(1)-(5) may be assigned a range of scores from machine-learning classification model 204 (e.g., as illustrated in FIGS. 5-7). Each of content items 202(1)-(M) may be added to an appropriate one of buckets 208(1)-(5) with the range of scores within which the score of the content item falls. For example, content item 202(1) may be added to bucket 208(2) if score 206(1) falls within the range of scores associated with bucket 208(2). Portions 210(1)-(5) of the content items from buckets 208(1)-(5), respectively, may then be selected and sent to human labelers 212 for labeling. Sets 214(1)-(5) may represent content items from portions 210(1)-(5), respectively, that are labeled by human labelers 212 as belonging to the class. In this example, sets 214(1)-(5) may be used as input for an estimator 216 to estimate prevalence 218 of the class of content within online system 110.

FIG. 3 is a flow diagram of an example computer-implemented method 300 for selecting content to send to labelers for prevalence estimation. The steps shown in FIG. 3 may be performed by any suitable computer-executable code and/or computing system, including online system 110 in FIG. 1. In one example, each of the steps shown in FIG. 3 may represent an algorithm whose structure includes and/or is represented by multiple sub-steps, examples of which will be provided in greater detail below.

As illustrated in FIG. 3, at step 310, one or more of the systems described herein may select an estimator of a prevalence of a class of content within an online system. The term "class of content," as used herein, generally refers to any type or category used to identify and/or distinguish content items based on their characteristics. In one example, the term "class of content" may refer to a type or category of content that violates a content policy of an online system. Examples of classes of content include, without limitation, objectionable content, offensive content, suggestive content, violent content, sensational content, illegal content, unintelligible content, malicious content, cyber-bullying content, hate-speech content, political content, content about a particular subject or topic, and/or content that reflects a specific sentiment.

The systems and methods described herein may select any suitable type of prevalence estimator. In one example, the systems and methods described herein may use Formula 1 as an estimator of the prevalence of a particular class of content within an online system and Formula 2 as a suitable approximation of the variance of the estimator (see below). In these formulae (and the additional formulae that will follow), $\hat{Y}$ may represent an estimation or approximation of the prevalence of the class of content within the online system, M may represent the number of samples considered, k may represent a number of buckets that are each assigned a different range or partition of the possible scores of a machine-learning classification model, $q_i$ may represent the probability that a sampled content item will fall into the $i^{th}$ bucket, $s_i$ may represent the sampling rate at which content items are sampled from the $i^{th}$ bucket, $p_i$ may represent the probability that a content item from the $i^{th}$ bucket will be of the class, $n_i$ may represent the total number of content items that are sampled from the $i^{th}$ bucket, and $z_i$ may represent the total number of content items that are sampled from the $i^{th}$ bucket and also labeled by a human labeler as being of the class. In the example illustrated in FIG. 2, M may equal M, k may equal 5, bucket 208(1) may represent the $1^{st}$ bucket, $q_1$ may represent the probability that one of content items 202(1)-(M) will fall into bucket 208(1), $s_1$ may represent the sampling rate at which content items are sampled from bucket 208(1), $p_1$ may represent the probability that a content item from bucket 208(1) will be of the class, $n_1$ may represent the total number of content items in portion 210(1), and $z_1$ may represent the total number of content items in set 214(1).

$$\hat{Y} = \sum_{i=1}^{k} \frac{z_i}{n_i} \frac{n_i}{s_i}$$ FORMULA 1

$$\mathrm{Var}(\hat{Y}) \approx M \sum_{i=1}^{k} \frac{q_i p_i}{s_i}$$ FORMULA 2

Figure 4:
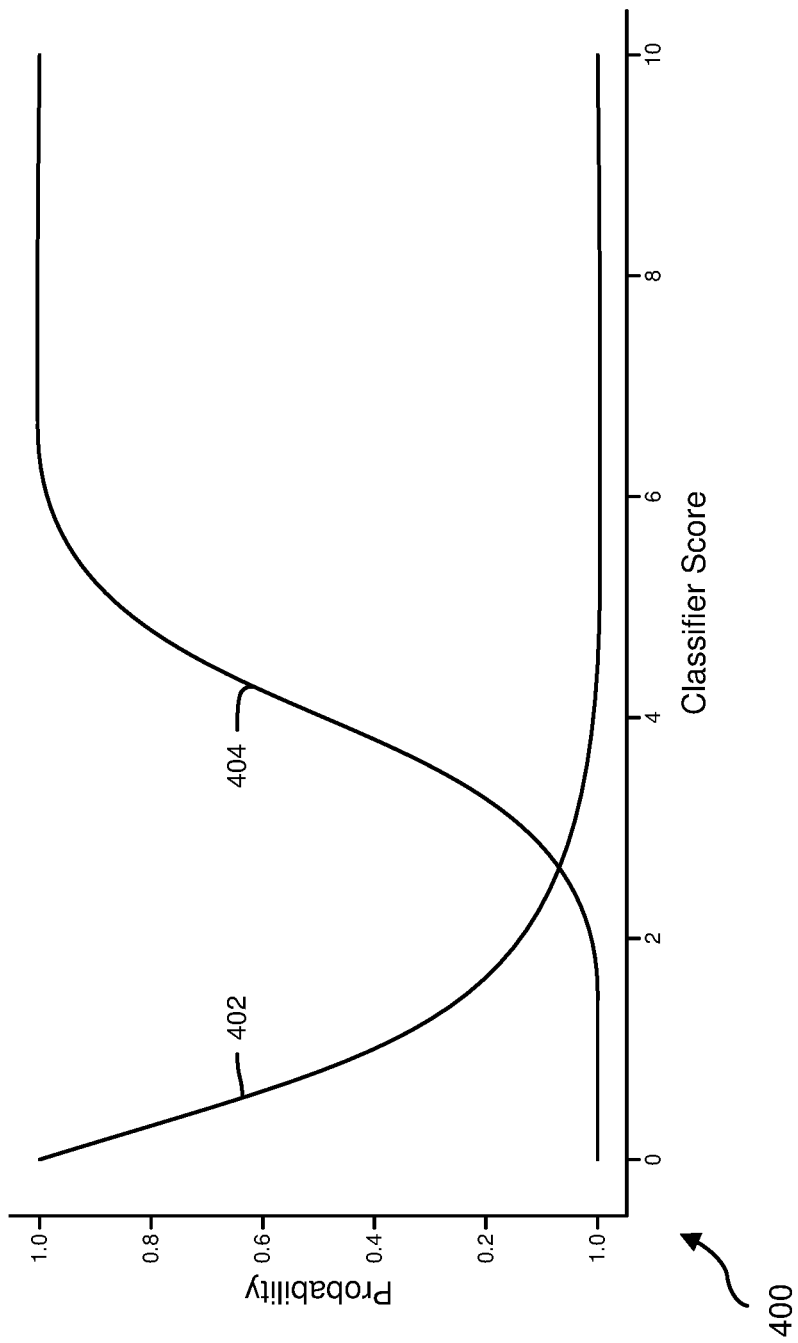
FIG. 4 is a graph diagram illustrating an exemplary probability distribution of a machine-learning classification model and exemplary class probabilities conditioned on scores of the machine-learning classification model.

FIG. 4 illustrates a probability distribution 402 of machine-learning classification model 204 and class probabilities 404 conditioned on the scores of machine-learning classification model 204. In these examples, probability distribution 402 may represent the probabilities that a content item will be assigned a particular score by machine-learning classification model 204 that indicates a likelihood that the content item is of a specific class of content, and class probabilities 404 may represent the probabilities that a content item that has been assigned a particular score by machine-learning classification model 204 will be of the class. In some examples, the systems and methods described herein may use probability distribution 402 to determine or estimate $q_i$ and may use class probabilities 404 to determine or estimate $p_i$.

Returning to FIG. 3, at step 320, one or more of the systems described herein may sample content items from the online system. The systems described herein may sample content items in any suitable manner and from any suitable source. In general, the systems described herein may randomly sample content items from the content items that are received at, stored on, or made available through an online system.

At step 330, one or more of the systems described herein may use, for each of the content items, a machine-learning classification model to generate a score for the content item that indicates a likelihood that the content item is of the class of content. As used herein, the term "machine-learning classification model" generally refers to any algorithm, heuristic, data, or combination thereof, that may be used to calculate a score that indicates a likelihood or probability that a content item is of a particular class. Examples of machine-learning classification models include, without limitation, decision trees, neural networks, deep-learning models, support vector machines, linear classifiers, non-linear classifiers, perceptrons, naive Bayes classifiers, any other machine-learning or classification techniques or algorithms, or any combination thereof.

In some examples, the systems described herein may generate more than one score for each content item sampled at step 320 using more than one machine-learning classification model that each is capable of generating a score for the content item that indicates a likelihood that the content item is of the class of content. In these examples, each machine-learning classification model may use different attributes of the content item to generate a score for the content item and/or may have been trained on different sets of training data.

Returning to FIG. 3, at step 340, one or more of the systems described herein may generate buckets that each (a) is assigned a range of scores from the machine-learning classification model and (b) contains a subset of the content items whose scores fall within the range of scores.

The systems described herein may initialize buckets and assign ranges or partitions of classification-model scores (e.g., upper and lower threshold scores) from the machine-learning classification models used at step 330 to each of the buckets using any suitable algorithm or heuristic, such as a suitable stratified-sampling algorithm or heuristic. Using FIG. 5 as an example, the systems and methods described herein may partition the classifier scores of machine-learning classification model 204 into five ranges or partitions and may assign each of these five ranges to one of buckets 208(1)-(5) as shown. In this example, bucket 208(5) has been assigned a range with a lower threshold score 502 and upper threshold score 504. After generating buckets, the systems and methods disclosed herein may add each of the content items sampled at step 320 to the appropriate bucket according to the scores of the content items that are generated at step 330.

As indicated above, the systems and methods disclosed herein may use more than one machine-learning classification model to score content items. In these examples, the systems described herein may assign, to each bucket, a range of scores from each machine-learning classification model. Using FIG. 8 as an example, the systems and methods described herein may assign to each of buckets 811-833 (1) a range of scores from a first classification model and (2) a range of scores from a second classification model as shown. In this example, buckets 813, 823, and 833 have each been assigned a range of scores from the first classification model with a lower threshold score 802 and upper threshold score 804. Likewise, buckets 831, 832, and 833 have each been assigned a range of scores from the second classification model with a lower threshold score 808 and upper threshold score 806.

In some examples, the systems described herein may determine an optimal number of buckets to generate and/or an optimal range of scores for each bucket. In some examples, the systems and methods described herein may use a decision-tree based algorithm to perform this task. For example, the systems and methods described herein may use a decision-tree based algorithm to recursively split scored content items into buckets and may stop splitting the scored content items of a bucket into additional buckets once the scores of the content items in the bucket reach a uniformity threshold (e.g., a threshold based on an entropy measurement of the scores of the content items that are contained in the bucket).

In some examples, the systems described herein may select a particular predetermined number of buckets to generate and then may calculate an optimal range of scores for each bucket. In one example, the systems described herein may calculate an optimal range of scores for each bucket that minimizes a variance metric of the estimator identified at step 310. In these examples, the systems described herein may iteratively perturb (e.g., using a suitable hill-climbing algorithm) an initial range of scores for each of the buckets until the variance metric of the estimator has been minimized. Each time the ranges of scores for the buckets are perturbed, the systems described herein may (1) determine, using a similar technique to those described below in connection with step 350, a sampling rate for each of the buckets that minimizes a variance metric of the estimator and (2) calculate the variance metric resulting from the determined sampling rates. The systems described herein may consider the ranges of scores for the buckets to be optimal when the variance metric converges.

FIGS. 5-7 illustrate various stages of bucket-partition optimization. In one example, the bucket partitions represented in FIG. 5 may represent an initial set of bucket partitions of buckets 208(1)-(5) before the bucket partitions have been optimized. The bucket partitions represented in FIG. 6 may represent an intermediate set of bucket partitions of buckets 208(1)-(5) that existed as the bucket partitions illustrated in FIG. 5 are being optimized. Finally, the bucket partitions represented in FIG. 7 may represent a final optimized set of bucket partitions of buckets 208(1)-(5).

Returning to FIG. 3, at step 350, one or more of the systems described herein may determine a sampling rate for each of the buckets that minimizes a variance metric of the estimator. As used herein, the term "variance metric" generally refers to any metric that measures the goodness of the estimator selected at step 310. In some examples, the term "variance metric" may refer to the variance of the estimator, the mean squared error of the estimator, or any other similar metric. The systems described herein may determine optimal variance-minimizing sampling rates in a variety of ways.

In some examples, the systems described herein may determine optimal sampling rates using constrained optimization (e.g., convex optimization). In some situations, an administrator of an online system may wish to specify the volume of content items that will be sent to human labelers for labeling. In these examples, the systems described herein may determine optimal sampling rates by solving a suitable optimization problem that attempts to minimize the variance of the estimator selected at step 310 subject to constraints that are based on the desired volume. For example, the systems described herein may determine optimal sampling rates by solving the optimization problem illustrated in Table 1 or the optimization problem illustrated in Table 2. In these formulae, N may represent the total number of content items that may or should be sent to human labelers for labeling, and $x_i$ may equal $$\frac{1}{s_i}.$$

TABLE 1

Maximize $$\frac{-\text{Var}(\hat{Y})}{M} = -\sum_{i=1}^{k} x_i q_i p_i$$

subject to $$\sum_{i=1}^{k} \frac{q_i}{x_i} = \frac{N}{M} \text{ and } s_i \geq 0$$

TABLE 2

Minimize $$\text{Var}(\hat{Y}) \approx M \sum_{i=1}^{k} \frac{q_i p_i}{s_i}$$

subject to $$\sum_{i=1}^{k} q_i s_i = \frac{N}{M} \text{ and } s_i \geq 0$$

In at least one example, the systems describe herein may use Formula 3 (see below) as a solution to the optimization problem illustrated in either Table 1 or Table 2. In this example, $s_i$ may represent the optimal sampling rate at which content items should be sampled from the $i^{th}$ bucket created at step 340.

$$s_i = \frac{N}{M} \frac{\sqrt{p_i}}{\sum_{j=1}^{k} q_j \sqrt{p_j}} \qquad \text{FORMULA 3}$$

In some situations, an administrator of an online system may wish to specify a proportion or percentage of the volume of content items that will be sent to human labelers for labeling that should or must be of a target class. In these examples, the systems described herein may determine optimal sampling rates by solving a suitable optimization problem that attempts to minimize the variance of the estimator selected at step 310 subject to constraints that are based on the desired proportion or percentage. For example, the systems described herein may determine optimal sampling rates by solving the optimization problem illustrated in Table 3 or the optimization problem illustrated in Table 4 whose constraints are based on a desired portion or percentage of the volume of content items that are sent to human labelers that should be of a target class. In these formulae, γ may represent a desired portion or percentage of the volume of content items that are sent to human labelers that should be of the target class.

TABLE 3

Minimize $$\text{Var}(\hat{Y}) \approx M \sum_{i=1}^{k} \frac{q_i p_i}{s_i}$$

TABLE 3-continued subject to $$\sum_{i=1}^{k} q_i s_i = \frac{N}{M} \text{ and } \sum_{i=1}^{k} p_i q_i s_i \geq \gamma \frac{N}{M} \text{ and } s_i \geq 0$$

TABLE 4

Minimize $$\text{Var}(\hat{Y}) \approx M \sum_{i=1}^{k} \frac{q_i p_i}{x_i}$$

subject to $$\sum_{i=1}^{k} q_i x_i = 1 \text{ and } \sum_{i=1}^{k} p_i q_i x_i \geq \gamma \text{ and } x_i \geq 0$$

Returning to FIG. 3, at step 360, one or more of the systems described herein may select, from each of the buckets, a portion of content items according to the sampling rate of the bucket. Then at step 370, one or more of the systems described herein may send the portion of content items from each of the buckets to one or more human labelers for labeling. After sending content items to the human labelers, the systems may (1) receive, from the human labelers, content items from each of the buckets that have been labeled by the human labelers as being of the class of content and (2) use the labeled content items and the estimator selected at step 310 to estimate the prevalence of the class of content within the online system.

As described above, by employing constrained-optimization techniques to identify optimal bucket sampling rates for selecting content items to send to human labelers for prevalence estimation purposes, the systems and methods disclosed herein may enable an administrator to specify (1) the volume of content items that should be sent to the human labelers and/or (2) the proportion of the volume that must be of a particular class of content. By enabling the administrator to specify the proportion of content items that must be of a particular class of content, the systems and methods disclosed herein may provide the human labelers with a higher number of content items that are or are likely to be of the class, which may improve the labeling accuracy of the human labelers.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including"

and "having" (and their derivatives), as used in the specification and claims, are interchangeable with and have the same meaning as the word "comprising."

What is claimed is:

1. A computer-implemented method comprising:
selecting an estimator of a prevalence of a class of content within an online system, wherein the estimator relies upon labeled content items that have been labeled by one or more human labelers as being of the class of content;
sampling a plurality of content items from the online system;
using, for each of the plurality of content items, a machine-learning classification model to generate a score for the content item, the score indicating a likelihood that the content item is of the class of content;
generating a plurality of buckets, wherein each of the plurality of buckets:
 is assigned a range of scores from the machine-learning classification model; and
 contains a subset of the plurality of content items whose scores fall within the range of scores;
determining a sampling rate for each of the plurality of buckets that minimizes a variance metric of the estimator;
selecting, from each of the plurality of buckets, a portion of content items according to the sampling rate of the bucket; and
sending the portion of content items from each of the plurality of buckets to the one or more human labelers for labeling.

2. The computer-implemented method of claim 1, wherein:
determining the sampling rate for each of the plurality of buckets comprises minimizing an approximation of the variance metric of the estimator subject to one or more constraints; and
the approximation of the variance metric of the estimator is based at least in part on the sampling rate of each of the plurality of buckets.

3. The computer-implemented method of claim 2, wherein:
the approximation of the variance metric of the estimator is further based at least in part on:
 a first probability metric of each of the plurality of buckets that indicates a probability that a sampled content item will fall into the bucket;
 a second probability metric of each of the plurality of buckets that indicates a probability that a sampled content item from the bucket will be of the class of content; and
 a count of the plurality of content items; and
the one or more constraints are based at least in part on:
 the sampling rate of each of the plurality of buckets;
 the first probability metric of each of the plurality of buckets;
 a predetermined volume of content items that will be sent to the human labelers; and
 the count of the plurality of content items.

4. The computer-implemented method of claim 3, wherein the one or more constraints are further based at least in part on:
a predetermined proportion of the predetermined volume of content items that must be of the class of content; and
the second probability metric of each of the plurality of buckets.

5. The computer-implemented method of claim 2, wherein the one or more constraints are based at least in part on:
a predetermined volume of content items that will be sent to the human labelers; and
a predetermined proportion of the predetermined volume that must be of the class of content.

6. The computer-implemented method of claim 1, wherein generating the plurality of buckets comprises:
initializing the plurality of buckets;
assigning an initial range of scores from the machine-learning classification model to each of the plurality of buckets; and
iteratively perturbing the initial ranges of scores of the plurality of buckets until the variance metric of the estimator is minimized.

7. The computer-implemented method of claim 6, wherein iteratively perturbing the initial ranges of the scores of the plurality of buckets comprises, during a single iteration:
reassigning a different range of scores from the machine-learning classification model to at least two of the plurality of buckets;
determining a probability metric of each of the plurality of buckets that indicates a probability that a sampled content item from the bucket will be of the class of content;
determining a sampling rate for each of the plurality of buckets that minimizes the variance metric of the estimator; and
calculating the variance metric of the estimator.

8. The computer-implemented method of claim 1, further comprising using, for each of the plurality of content items, an additional machine-learning classification model to generate an additional score for the content item, the additional score indicating an additional likelihood that the content item is of the class of content, wherein each of the plurality of buckets:
is further assigned an additional range of scores from the additional machine-learning classification model; and
contains a subset of the plurality of content items whose scores fall within the range of scores and whose additional scores fall within the additional range of scores.

9. The computer-implemented method of claim 1, further comprising:
receiving, from the one or more human labelers, the labeled content items that have been labeled by the one or more human labelers as being of the class of content; and
using the labeled content items and the estimator to estimate the prevalence of the class of content within the online system.

10. The computer-implemented method of claim 1, wherein the class of content violates a content policy of the online system.

11. A system comprising:
an estimator-selecting module, stored in memory, that selects an estimator of a prevalence of a class of content within an online system, wherein the estimator relies upon labeled content items that have been labeled by one or more human labelers as being of the class of content;
a sampling module, stored in memory, that samples a plurality of content items from the online system;

a scoring module, stored in memory, that uses, for each of the plurality of content items, a machine-learning classification model to generate a score for the content item, the score indicating a likelihood that the content item is of the class of content;

a bucketing module, stored in memory, that generates a plurality of buckets, wherein each of the plurality of buckets:
- is assigned a range of scores from the machine-learning classification model; and
- contains a subset of the plurality of content items whose scores fall within the range of scores;

a rate-determining module, stored in memory, that determines a sampling rate for each of the plurality of buckets that minimizes a variance metric of the estimator;

a content-selecting module, stored in memory, that selects, from each of the plurality of buckets, a portion of content items according to the sampling rate of the bucket;

a sending module, stored in memory, that sends the portion of content items from each of the plurality of buckets to the one or more human labelers for labeling; and at least one physical processor configured to execute the estimator-selecting module, the sampling module, the scoring module, the bucketing module, the rate-determining module, the content-selecting module, and the sending module.

12. The system of claim 11, wherein:
the rate-determining module determines the sampling rate for each of the plurality of buckets by minimizing an approximation of the variance metric of the estimator subject to one or more constraints; and
the approximation of the variance metric of the estimator is based at least in part on the sampling rate of each of the plurality of buckets.

13. The system of claim 12, wherein:
the approximation of the variance metric of the estimator is further based at least in part on:
- a first probability metric of each of the plurality of buckets that indicates a probability that a sampled content item will fall into the bucket;
- a second probability metric of each of the plurality of buckets that indicates a probability that a sampled content item from the bucket will be of the class of content; and
- a count of the plurality of content items; and the one or more constraints are based at least in part on:
- the sampling rate of each of the plurality of buckets;
- the first probability metric of each of the plurality of buckets;
- a predetermined volume of content items that will be sent to the human labelers; and
- the count of the plurality of content items.

14. The system of claim 13, wherein the one or more constraints are further based at least in part on:
- a predetermined proportion of the predetermined volume of content items that must be of the class of content; and
- the second probability metric of each of the plurality of buckets.

15. The system of claim 12, wherein the one or more constraints are based at least in part on:
- a predetermined volume of content items that will be sent to the human labelers; and
- a predetermined proportion of the predetermined volume that must be of the class of content.

16. The system of claim 11, wherein the bucketing module generates the plurality of buckets by:
- initializing the plurality of buckets;
- assigning an initial range of scores from the machine-learning classification model to each of the plurality of buckets; and
- iteratively perturbing the initial ranges of scores of the plurality of buckets until the variance metric of the estimator is minimized.

17. The system of claim 16, wherein the bucketing module iteratively perturbs the initial ranges of the scores of the plurality of buckets by, during a single iteration:
- reassigning a different range of scores from the machine-learning classification model to at least two of the plurality of buckets;
- determining a probability metric of each of the plurality of buckets that indicates a probability that a sampled content item from the bucket will be of the class of content;
- determining a sampling rate for each of the plurality of buckets that minimizes the variance metric of the estimator; and
- calculating the variance metric of the estimator.

18. The system of claim 11, wherein:
the scoring module further uses, for each of the plurality of content items, an additional machine-learning classification model to generate an additional score for the content item, the additional score indicating an additional likelihood that the content item is of the class of content; and
each of the plurality of buckets:
- is further assigned an additional range of scores from the additional machine-learning classification model; and
- contains a subset of the plurality of content items whose scores fall within the range of scores and whose additional scores fall within the additional range of scores.

19. The system of claim 11, further comprising a prevalence-estimating module, stored in memory, that:
- receives, from the one or more human labelers, the labeled content items that have been labeled by the one or more human labelers as being of the class of content; and
- uses the labeled content items and the estimator to estimate the prevalence of the class of content within the online system.

20. A non-transitory computer-readable medium comprising one or more computer-readable instructions that, when executed by at least one processor of a computing device, cause the computing device to:
- select an estimator of a prevalence of a class of content within an online system, wherein the estimator relies upon labeled content items that have been labeled by one or more human labelers as being of the class of content;
- sample a plurality of content items from the online system;
- use, for each of the plurality of content items, a machine-learning classification model to generate a score for the content item, the score indicating a likelihood that the content item is of the class of content;
- generate a plurality of buckets, wherein each of the plurality of buckets:

is assigned a range of scores from the machine-learning classification model; and contains a subset of the plurality of content items whose scores fall within the range of scores;

determine a sampling rate for each of the plurality of buckets that minimizes a variance metric of the estimator;

select, from each of the plurality of buckets, a portion of content items according to the sampling rate of the bucket; and send the portion of content items from each of the plurality of buckets to the one or more human labelers for labeling.

\* \* \* \* \*